(12) United States Patent
Darby et al.

(10) Patent No.: US 6,619,231 B2
(45) Date of Patent: Sep. 16, 2003

(54) WATERING DEVICE FOR CHICK TRAYS

(76) Inventors: Mark D. Darby, 3200 Rockport Ct., #9, Cumming, GA (US) 30041; Marshall B. Cole, 25 Hickory Cove, Stockbridge, GA (US) 30281

(*) Notice: Subject to any disclaimer, the term of this patent is extended or adjusted under 35 U.S.C. 154(b) by 0 days.

(21) Appl. No.: 10/198,039

(22) Filed: Jul. 18, 2002

(65) Prior Publication Data

US 2003/0056731 A1 Mar. 27, 2003

Related U.S. Application Data (60) Provisional application No. 60/324,429, filed on Sep. 24, 2001.

(51) Int. Cl.$^7$ .................................................. A01K 7/00
(52) U.S. Cl. ........................................................ 119/72
(58) Field of Search .............................. 119/72, 77, 74, 119/75, 416, 417, 456, 452, 475, 487, 490, 467, 51.5

(56) References Cited

U.S. PATENT DOCUMENTS

| | | | |
|---|---|---|---|
| 3,952,703 A | 4/1976 | Erfeling |
| 3,965,864 A | 6/1976 | Beltz |
| 4,188,914 A | 2/1980 | Lage |
| 5,588,395 A | 12/1996 | Lee |
| 5,857,429 A | 1/1999 | Hostetler |
| 6,158,388 A | 12/2000 | Wenstrand |

*Primary Examiner*—Charles T. Jordan
*Assistant Examiner*—Judith A. Nelson
(74) *Attorney, Agent, or Firm*—Kenneth S. Watkins, Jr.

(57) ABSTRACT

A watering insert [18] for chick transport trays [1A, 1B] utilizes a plurality of watering nipples [17] connected to, and communicating with, a central water tank [27]. The insert utilizes a support surface [44] along the periphery [50] of the insert for supporting the insert in the open top of the tray at a height sufficient to allow chicks to activate the watering nipples. The water tank comprises an upper removable portion [28] and a lower portion [30] containing the nipples. A vented fill cap [21] allows convenient filling of the insert tank and provides a vacuum break when the nipples are activated.

20 Claims, 7 Drawing Sheets

WATERING DEVICE FOR CHICK TRAYS

CROSS-REFERENCES TO RELATED APPLICATIONS

This application is entitled to the benefit of Provisional Patent Application Ser. No. 60/324,429 filed Sep. 24, 2001.

FIELD OF THE INVENTION

The present invention relates to transport trays for small animals and, more particularly, to chick transport trays with integral watering capability.

BACKGROUND OF THE INVENTION

Chicks are usually transported from the hatchery to the farm or poultry house in large numbers. These very young birds are prone to dehydration, which can reduce the survival rate and slow the growth rate of the surviving birds. The transport device is usually a rectangular tray, which gives the chicks enough headroom while being as space efficient as possible.

Typical chick transport trays contain air vent holes, which allow air to circulate freely. Various configurations add rigidity to the chick transport trays, making them able to withstand the load of chick transport trays stacked on top. In addition, various watering devices have been disclosed in the past. In general, the previously disclosed watering devices fail to give each chick in the tray easy access to water.

A watering attachment for fowl cages disclosed in U.S. Pat. No. 6,158,388 is labor-intensive to fill and clean; it can obstruct easy stacking of the transport trays. In addition, it is not easily accessible by all birds in the transport tray.

U.S. Pat. No. 5,588,395 discloses a floor-mounted watering tray; these watering trays minimize available floor space in the transport trays and can create a safety hazard for the chicks. In addition, chicks along the sides of the tray do not have easy access to water.

Various types of watering valves have also been disclosed in U.S. Pat. Nos. 3,952,703 and 5,857,429. These watering valves are fed from a piping system along the sides of the transport tray or a piping system that runs just above the chick's heads. Due to the complexity of the piping system, this watering system does not provide the plurality of watering valves necessary for easy access by all chicks in the transport tray.

An improved chick transport tray is needed, which is safe for the chicks and provides easy water access for all chicks in the transport tray. In addition, the needed watering device should be easy to clean, store, fill and use. The transport tray should stack easily, stabilizing the column of transport trays.

OBJECTS AND SUMMARY OF THE INVENTION

Therefore, an object of the present invention is to provide a watering device for a chick transport tray with an integrated watering tank.

A further object of the present invention is to supply a number of watering nipples, which provide easy, safe access to clean water for all the chicks in the transport tray, regardless of their location in the transport tray.

A further object of the present invention is to provide a watering device that is easy to remove, clean, store and fill.

A further object of the present invention is to integrate the watering device into the tray in such a way that the trays will stack easily.

Further objects and advantages of my invention will become apparent from a consideration of the drawings and ensuing description.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1A:
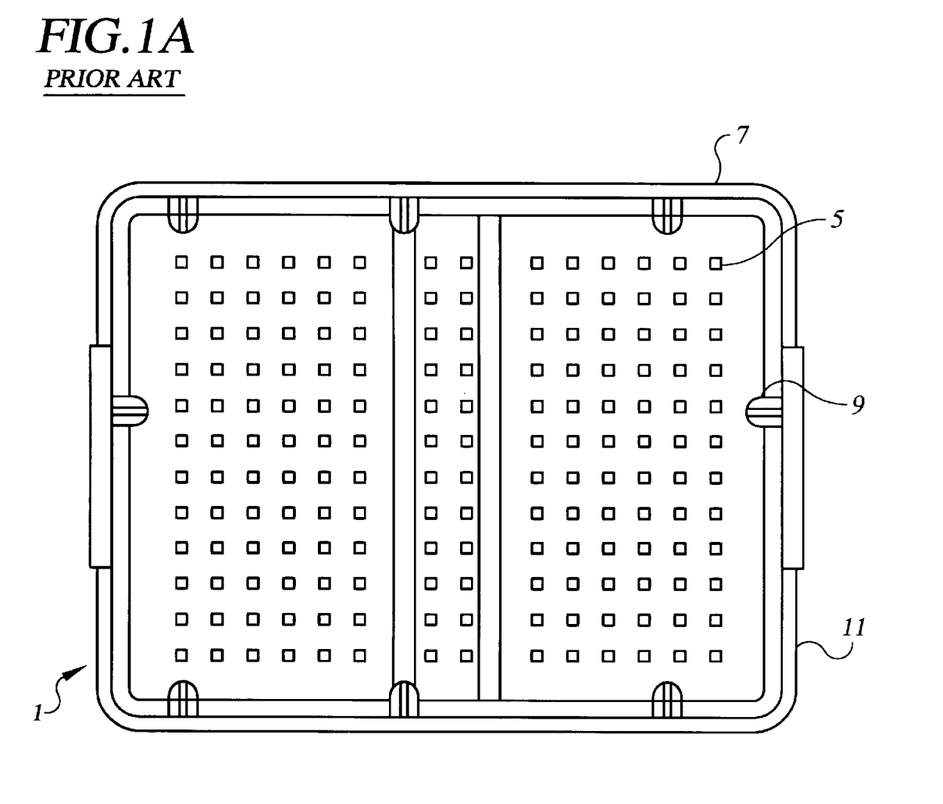
FIG. 1A is a top view of a prior art chick transport tray.
Figure 1B:
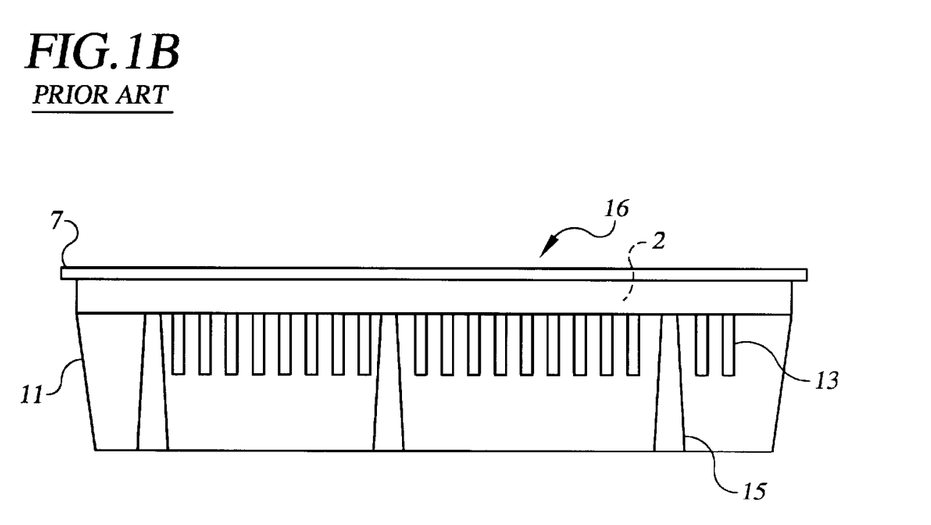
FIG. 1B is a side view of a prior art chick transport tray.

FIG. 1A and FIG. 1B show top and side elevation views of a prior art chick tray 1. In FIG. 1A, vent holes 5 allow air to circulate easily. Upper ledge 7 and stacking supports 9 provide support surfaces for trays stacked on each other for space efficient transport. In FIG. 1B, walls 11 form a substantially vertical side enclosure for the chicks. Vent holes 13 allow air to circulate to the young birds and stiffeners 15 increase the rigidity of walls 11. Tray 1 comprises an interior portion 2 and an open top 16.

The following is a description of the preferred embodiments of the chick transport tray with watering device.

Figure 2:
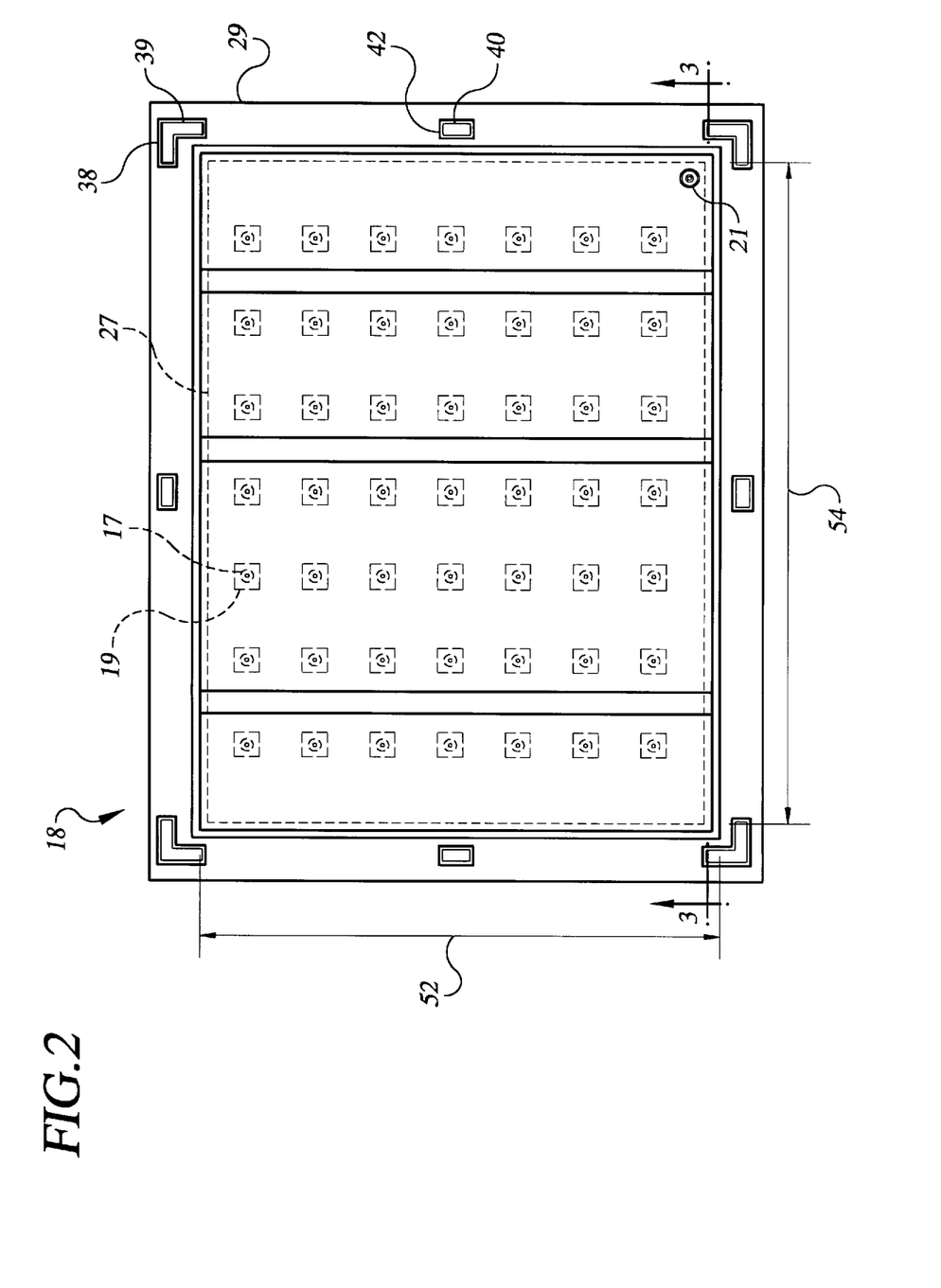
FIG. 2 is a top view of the preferred embodiment of the chick transport tray insert of the present invention, which includes an integral water tank, nipples and fill and vent connection.
Figure 3:
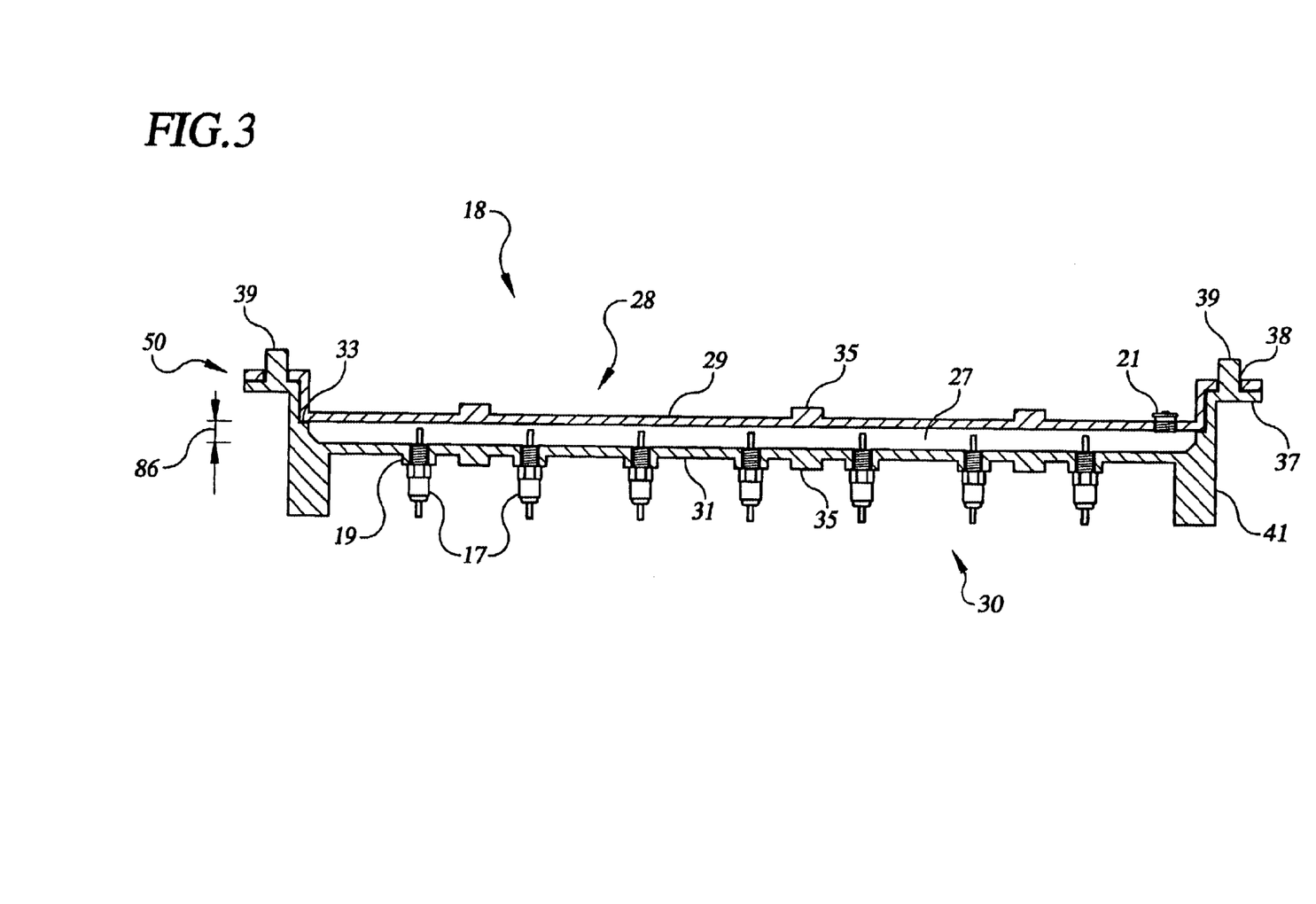
FIG. 3 is a cross-sectional elevation of the preferred embodiment of the chick transport tray insert taken along lines 3—3 of FIG. 2.

FIGS. 2 and 3 show a top view and cross-sectional elevation, respectively, of tray insert 18. Tray 18 comprises an upper portion 28 and a lower portion 30 defining an integral water tank 27. In this preferred embodiment, nipples 17 for providing water to the birds attach to nipple bosses 19 on the tank bottom 31 of insert 18. Water flows from the tank 27 on demand as a chick activates nipple 17. Fill cap 21 permits easy filling and venting of water tank 27. Upper guides 39 align and secure upper lid 29 onto tank bottom 31.

Nipples 17 define a geometrical array (or plurality) of water outlets, which cover a substantial portion of tank bottom 31, providing easy water access for the chicks, regardless of the chick's location in the tray. In the preferred embodiments, one nipple is provided for every 2–10 birds. In one preferred embodiment, the geometric array of nipples comprises at least 6 nipples. In the more preferred embodiments, the geometric array comprises at least 12 nipples. In the most preferred embodiments, the geometric array comprises at least 24 nipples.

In one preferred embodiment, nipples are arrayed in rows and columns containing 2–10 nipples in each row and column. In a more preferred embodiment, 3–7 nipples are provided in each row and column. In the embodiment shown, each row and column contains 7 nipples. The nipples 17 control flow of water from water tank 27 so the water flows on demand as a chick activates nipple 17.

Referring to FIGS. 2 and 3, fill cap 21 permits filling of water tank 27. Fill cap 21 also allows water tank 27 to vent. In the preferred embodiment, water tank 27 forms a shallow cavity, which covers most of the horizontal area of the insert 18 because this large, shallow tank distributes the water over the entire area above where the chicks reside, thus providing easy gravity feed for a plurality of nipples 17. The large, shallow tank also creates a space efficient configuration. In the preferred embodiments, tank 27 is a generally rectangular prism. In the preferred embodiments, the width 52 and length 54 of tank 27 are greater than the height or thickness 56. In the preferred embodiments, width 52 and length 54 are at least 4 times thickness 56. In the more preferred embodiments, width 52 and length 54 are greater than 8 times thickness 56. Other embodiments could offer a variety of different tank shapes such as right circular cylinders, hexagonal prisms or other polyhedra.

Corner slots 38 and side slots 42 of lid 29 slide over and engage upper corner guides 39 and side guides 40, respectively of tank bottom 31 to align and secure lid 29 to tank bottom 31. Upper lid 29 of insert 18 seals against tank bottom 31 to form water tank 27. This two-part tank design facilitates tank cleaning because upper lid 29 can be removed easily. Lid seal 33 is an elastomeric seal, gasket or O-ring, which prevents water leakage. Upper lid 29 comprises stiffeners 35 and fill cap 21. Stiffeners 35 in upper lid 29 and tank bottom 31 reduce deflection. Tank bottom 31 comprises nipple boss 19, stiffeners 35, tray support ledge 37, upper guide 39 and lower extension 41. Nipple boss 19 comprises a threaded bottom, which is designed to accept a standard water nipple 17.

Figure 5:
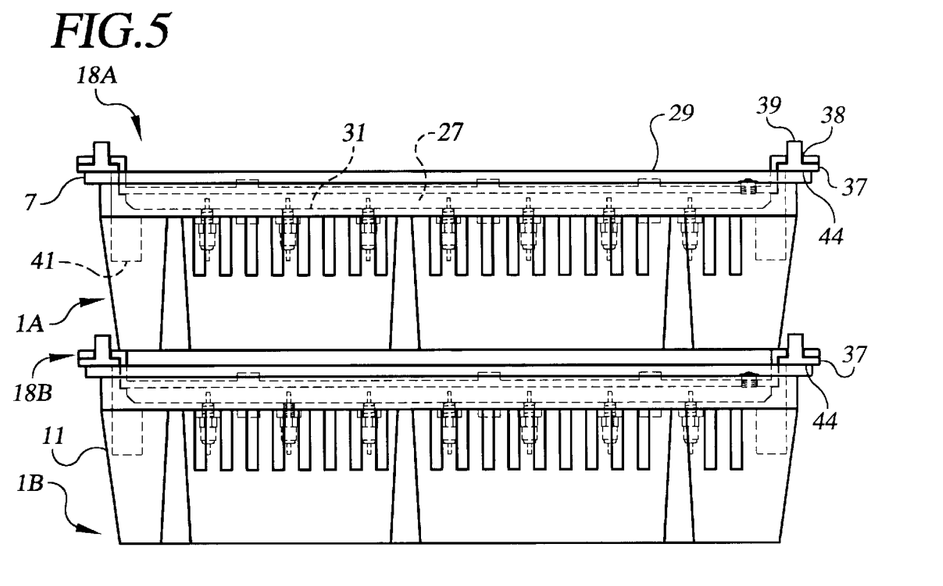
FIG. 5 is a cross-sectional elevation of the preferred embodiment of the chick transport tray, showing the trays with inserts nested together.

Tray support ledge 37 on peripheral portion 50 provides a means of supporting insert 18 in the open top portion 16 of a standard chick tray (see FIG. 5). Upper corner guides 39 and side guides 40 also facilitate stacking of multiple inserts 18 by providing a lip to guide lower extension 41 into the proper position (see FIG. 8); when insert 18 is not in use. Lower extension 41 fits inside upper corner guide 39 to simplify storage. Lower extension 41 also provides a support surface for stacking inserts 18 (see FIG. 8). When chick transport tray is in use, insert 18 fits on top of tray 1A and 1B, housing the chicks with easy access to water.

Figure 4:
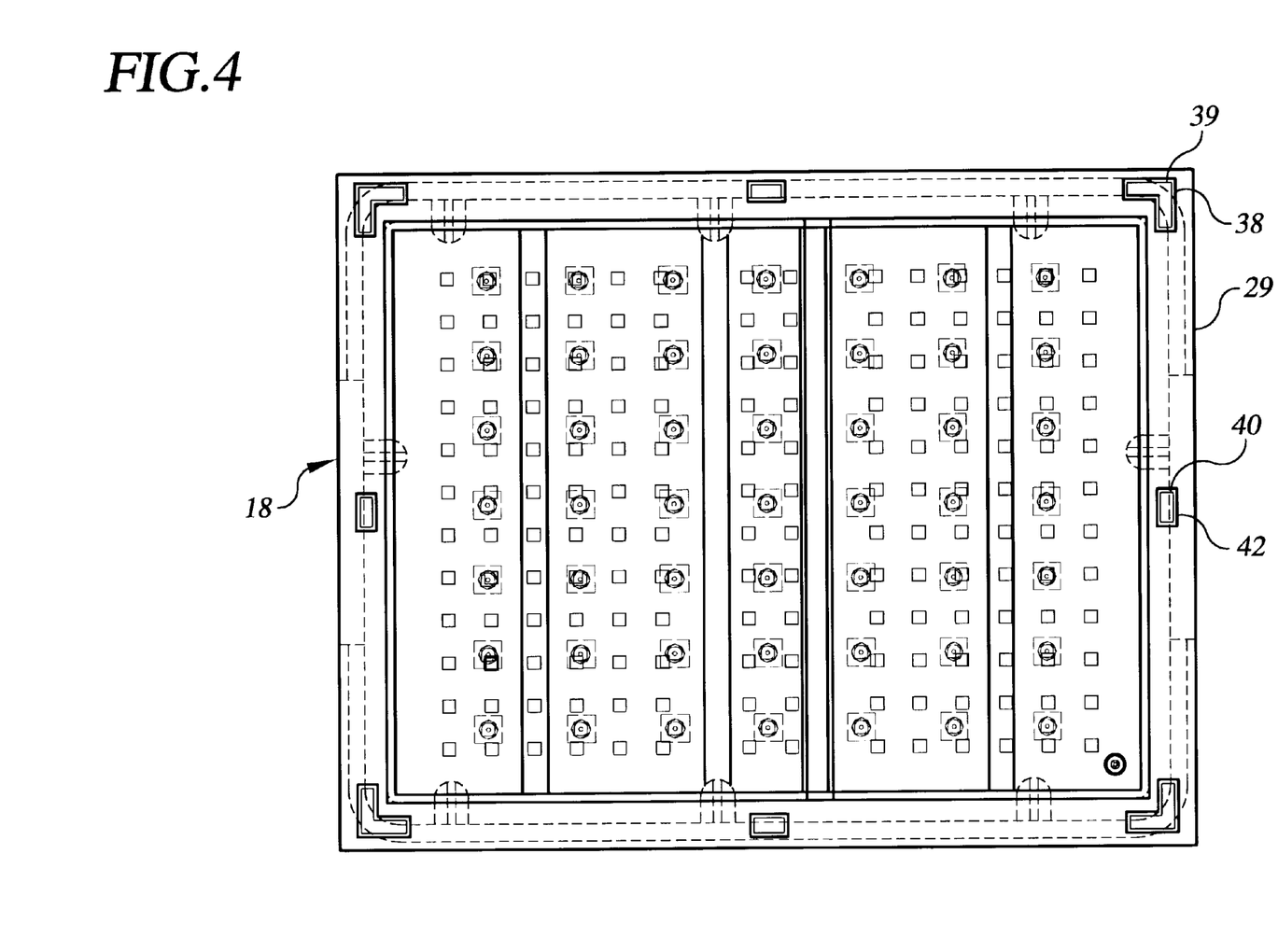
FIG. 4 is a top view of the preferred embodiment of the chick transport tray insert installed in a chick tray, showing the guides, which simplify assembling the upper and lower portions of the water tank.

FIGS. 4 and 5 show top and side elevation views respectively of inserts 18A and 18B installed in the chick trays (1A and 1B). Support means such as support ledge 37 of inserts 18A and 18B provides a means to support the chick transport tray from trays 1A and 1B. The horizontal support surface 44 of insert support ledges 37 of the inserts bear on the horizontal surface of tray upper ledge 7 of wall 11 of the trays to support the inserts within the open top 16 and interior portion 2 of trays 1A and 1B.

In the preferred embodiments, inserts 18 are supported in interior portion 2 of the multi-wall chick transport tray from at least two walls 11 of the multi-wall tray 1. In the more preferred embodiments, support ledge 37 supports inert 18 from at least 3 walls of tray 1. In the most preferred embodiments, support ledge 37 supports inserts 18 from four walls of tray 1. Support from less than the 4 walls may be used when inert 18 is less than the full length or width of tray 1. Other support means may be used to support inserts 18A and 18B such as various mechanical joints including butt joints, mortise and tendon joints, friction fits, or mechanical fasteners such as screws, dowels, or hook and loop fasteners.

In the preferred embodiments, the support means of inserts 18A and 18B supports the watering nipples at a height sufficient to prevent inadvertent contact of the birds with the nipples, but not so high that the birds cannot activate the nipples for watering. For chicks, the support means supports the watering nipples 3½" to 4½ inches from the floor of the chick tray.

Figure 6:
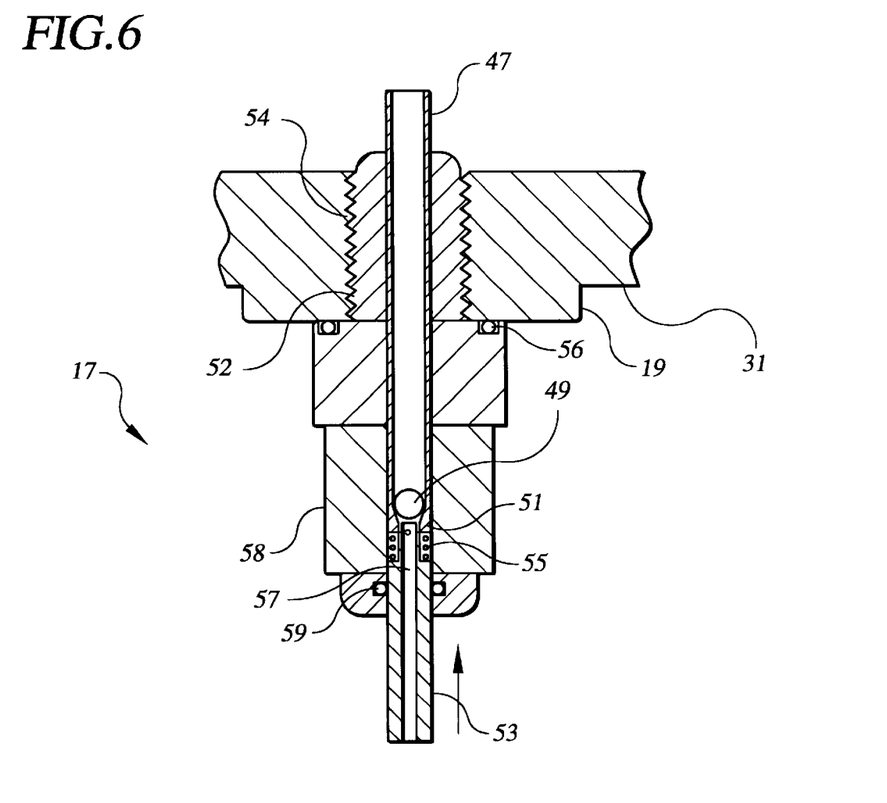
FIG. 6 is a cross-sectional drawing of the water nipple.

FIG. 6 is a cross-sectional view of one embodiment of a watering nipple such as nipple 17. Water enters nipple 17 from water tank 27 of FIG. 3 through upper supply tube 47. When a chick pushes up on drinking tube 53 disposed at the bottom of the nipple, helical spring 55 compresses, allowing ball 49 to rise off seat 51. When ball 49 rises off seat 51, water flows through hole 57 into drinking tube 53 and into chick's mouth.

A seal, such as lip seal 59 seals moveable drinking tube 53 to body 58 of nipple 17 and prevents water from leaking around the outside of drinking tube 53. Threads 52 of nipple 17 engage complementary threads 54 of boss 19 to secure nipple 17 to tank bottom 31. A seal, such as O-ring seal 56 seals body 58 of nipple 17 to boss 19.

In a preferred embodiment, nipple 17 is a standard bird watering nipple such as Impex model no. BNP-10026.

Figure 7:
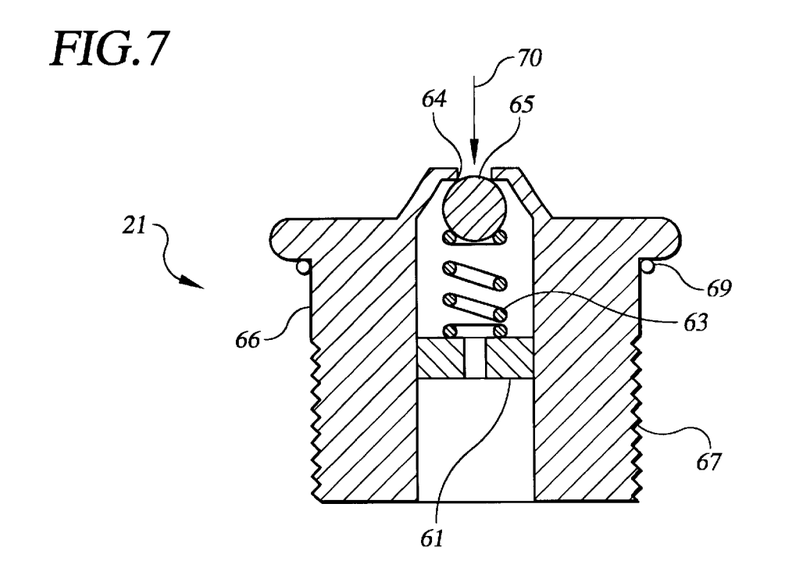
FIG. 7 is a cross-sectional drawing of the fill cap.

FIG. 7 shows a cross-sectional view of fill cap 21, which provides a convenient means for water to be added to the water tank 27 in addition to venting the water tank. Ball 65, biased against seat 64 by helical spring 63 prevents backflow (leakage) of water from tank 27. Bushing 61 retains helical spring 63 and ball 65 in their normal operating position. Differential pressure caused by atmospheric pressure outside of tank 27 and reduced pressure in tank 27 as tank 27 is emptied, provides an opening force to ball 65 against spring pressure, allowing air 70 to enter tank 27. Threads 67 of fill cap 21 engage complementary threads in upper lid 29 of water tank 27. A seal, such as O-ring seal 69 seals body 66 of cap 21 to upper lid 29. In other embodiments, a separate fill cap and vent valve may be disposed on insert 18. In still other embodiments, no fill cap is provided, and upper lid 29 is removed to fill tank 27.

Figure 8:
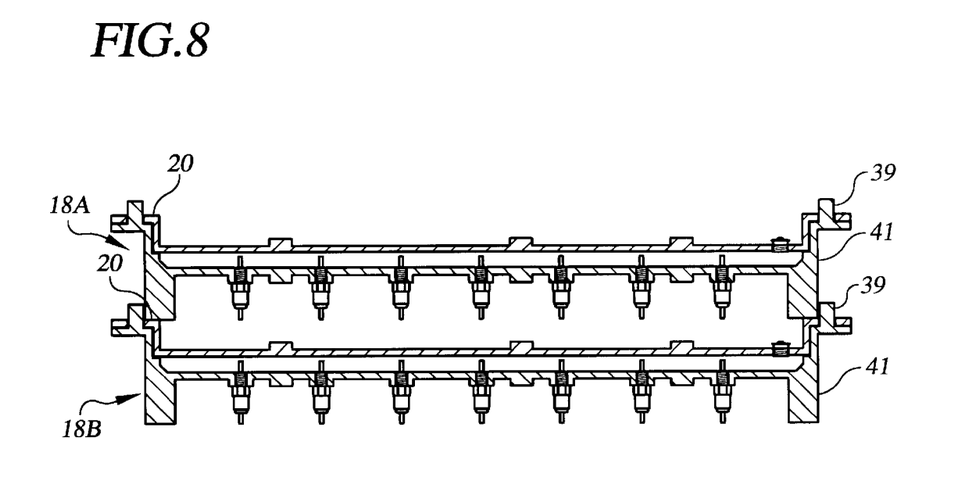
FIG. 8 is a cross-sectional elevation of the chick transport tray inserts of the preferred embodiment stacked for space-efficient storage.

FIG. 8 is a side elevation drawing of two inserts, 18A and 18B stacked and nested for storage, convenience and space reduction. Upper corner guides 39 align and secure lower extensions 41 of the upper insert 18A onto support surface 20 of a lower insert 18B.

Figure 9:
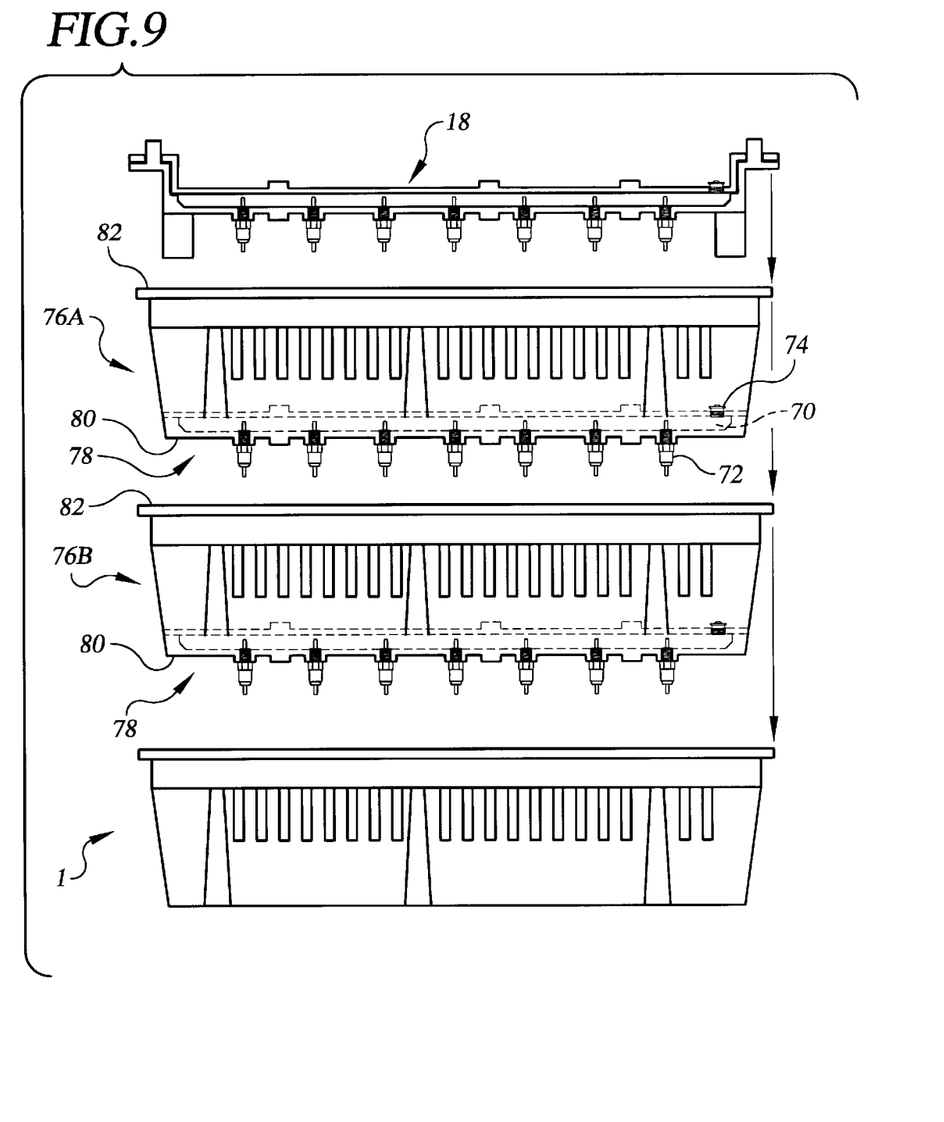
FIG. 9 is a side view of an alternate embodiment of the present invention integrating the watering device and tank in a chick tray, the bottom of one chick transport tray forms the lid of the chick transport tray below it.

FIG. 9 shows a side view of an alternate embodiment of the present invention. The alternate embodiment integrates the components of insert 18 of the previous embodiment in the bottom portion of a tray, such as tray 1 of FIGS. 1A and 1B. In this alternate embodiment, the water tank 70, nipples 72 and fill cap 74 comprise the bottom portion 78 of water trays 76A and 76B. The bottom portion 78 of the upper tray 76A forms a watering lid for the tray 76B below it. Support ledge 80 on bottom portion 78 provides a support means for supporting the upper tray 76A from the upper portion of the lower tray such as upper ledge 82 of the lower tray 76B. Alternatively, stacking supports such as stacking supports 9 of FIG. 1A can be used to support the upper watering tray.

In this alternate embodiment, the top most chick transport tray in a stack can use insert 18 as shown in FIG. 3 and the bottom most chick transport tray in a stack can use a standard chick tray 1 of FIGS. 1A and 1B.

In the preferred embodiments, lid 29 and tank bottom 31 of insert 18 are made of a polymeric material such as polyolefins, polyvinyl chloride (PVC), polyamides (PA), polyethyleneterephthalate (PET), polyimides (PI), polystyrenes (PS), acrylonitrile butadiene styrene (ABS) or other polymers and copolymers known in the art. In one preferred embodiments, the insert is made of polyethylene. Lid 29 and tank bottom 31 may be molded, cast or fabricated. In other embodiments, lid 29 and tank bottom 31 may be made of metal. In still other embodiments, lid 29 and tank bottom 31 may be integrated into a one-piece unit, for example by blow molding or rotational molding techniques.

Alternate embodiments may use this technology for feeding and/or watering small animals such as other birds and small mammals and reptiles.

Accordingly, the reader will see that the chick transport tray with watering device provides an improved apparatus to keep baby chicks hydrated in route from the hatchery to the poultry farm. The device provides the following additional advantages:

It contains a watering device, which is safe for the chicks.
It provides easy water access for all chicks in the transport tray.
It is easy to clean, store, fill and use.
The transport tray stacks easily, stabilizing the column of transport trays.
Watering inserts are stackable and nestable.
Watering inserts employ standard chick trays.

Although the description above contains many specifications, these should not be construed as limiting the scope of the invention but merely providing illustrations of some of the presently preferred embodiments of this invention. Thus the scope of the invention should be determined by the appended claims and their legal equivalents, rather than by the examples given.

We claim:

1. A watering insert for use with a small animal tray with an open top portion and a side wall, the insert comprising:
    an upper portion and a lower portion defining an enclosed tank, the enclosed tank having length and width dimensions greater than a thickness dimension;
    a plurality of watering nipples attached to the lower portion of the insert and in communication with the enclosed tank said plurality of watering nipples arranged in a geometric array extending over said length and width dimensions;
    a support means for supporting the insert in the open top portion of the small animal tray.

2. The watering insert of claim 1 wherein the means for supporting the insert comprises a support element on a peripheral portion of the insert, the support element engaeable with said side wall of the small animal tray.

3. The watering insert of claim 2 wherein the support element is a support ledge on the peripheral portion of the insert, the support ledge engaging said side wall of the small animal tray.

4. The watering insert of claim 2 wherein the small animal tray comprises two side walls and the insert comprises two support ledges on said peripheral portion, said two support ledges engageable with said two side walls of the small animal tray.

5. The watering insert of claim 2 wherein the small animal tray comprises three side walls and the insert comprises three support ledges on said peripheral portion, said three support ledges engageable with said three side walls of the small animal tray.

6. The watering insert of claim 2 wherein the small animal tray comprises four side walls and the insert comprises four support ledges on said peripheral portion, said four support ledges engageable with said four side walls of the small animal tray.

7. The watering insert of claim 1 wherein the upper portion defines a removable lid of the insert.

8. The watering insert of claim 7 wherein the removable lid comprises a fill cap.

9. The watering insert of claim 8 wherein the removable lid comprises a vent valve.

10. The watering insert of claim 7 wherein the removable lid comprises an elastomeric seal to seal the removable lid from the lower portion of the insert.

11. The watering insert of claim 9 wherein the vent valve is integral with the fill cap.

12. The watering insert of claim 1 wherein the insert comprises a lower extension and an upper guide for stacking support of a plurality of inserts, said lower extension of a first insert engageable with an upper guide of a second insert stackable on the first insert.

13. The watering insert of claim 1 wherein said plurality of nipples is a geometric array of at least 6 nipples.

14. The watering insert of claim 13 wherein the geometric array comprises rows of at least 3 nipples each, and columns of at least 2 nipples each.

15. A watering insert for use with a small animal tray with an open top portion and four side walls, the insert comprising:
    an upper portion and a lower portion defining an enclosed tank, the enclosed tank being generally rectangular prism solid shape and comprising length and width dimensions greater than a thickness dimension;
    a plurality of watering nipples attached to the lower portion of the insert and in communication with the enclosed tank;
    a support ledge on a peripheral portion of the insert, the support ledge engageable with at least three side walls of the small animal tray to support the insert in the open top portion of the tray.

16. A watering tray for small animals, the tray comprising:
    four sides;
    an open top;
    a bottom portion comprising a water tank and a plurality of watering nipples extending downward from the water tank, said plurality of watering nipples in communication with the water tank;
    a support element for supporting the watering tray in a nesting arrangement with a second watering tray wherein the watering nipples are disposed in the open top of the second watering tray.

17. A watering insert for use with stackable small animal trays with an open top portion and four side walls, the insert comprising:
    an enclosed water tank;
    a plurality of watering nipples attached to a lower portion of the insert and in communication with the enclosed tank;

a first support element for supporting the insert in the open top portion of a first small animal tray; and a second support element for supporting a second small animal tray in a vertically stacked arrangement.

18. The watering insert of claim 17 wherein the first support element is a peripheral support ledge engageable with at least two of said four side walls of said first small animal tray.

19. The watering insert of claim 18 wherein said second support element is a horizontal support surface of predetermined dimensions and engageable with a base portion of the second small animal tray.

20. The watering insert of claim 17 comprising at least 12 watering nipples disposed over a substantial portion of the insert whereby sufficient nipples are provided for a full chick tray.

* * * * *